United States Patent
Sheth et al.

(10) Patent No.: US 8,910,261 B2
(45) Date of Patent: Dec. 9, 2014

(54) RADIUS POLICY MULTIPLE AUTHENTICATOR SUPPORT

(71) Applicants: Tiru Kumar Sheth, Ottawa (CA); Ramaswamy Subramanian, Ottawa (CA)

(72) Inventors: Tiru Kumar Sheth, Ottawa (CA); Ramaswamy Subramanian, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/630,227

(22) Filed: Sep. 28, 2012

(65) Prior Publication Data

US 2014/0096214 A1 Apr. 3, 2014

(51) Int. Cl.
*G06F 7/04* (2006.01)
*G06F 15/16* (2006.01)

(52) U.S. Cl.
USPC .............................................. 726/7; 709/203

(58) Field of Classification Search
CPC ....... G06F 21/31; H04L 63/08; H04L 63/083; H04L 9/32; H04L 63/0861
USPC .......... 726/6, 7, 8, 1, 3, 9; 713/150, 155, 168; 380/44, 270; 455/406, 405, 410; 709/203
See application file for complete search history.

(56) References Cited

U.S. PATENT DOCUMENTS

| | | | |
|---|---|---|---|
| 7,574,202 B1 * | 8/2009 | Tsao et al. | 455/411 |
| 2005/0208926 A1 * | 9/2005 | Hamada | 455/410 |
| 2006/0002334 A1 * | 1/2006 | Washburn, III | 370/328 |
| 2006/0095959 A1 * | 5/2006 | Williams et al. | 726/8 |
| 2008/0250477 A1 * | 10/2008 | Samuelsson et al. | 726/4 |
| 2009/0019521 A1 * | 1/2009 | Vasudevan | 726/3 |
| 2009/0217033 A1 * | 8/2009 | Costa et al. | 713/155 |
| 2010/0031334 A1 * | 2/2010 | Shaikh | 726/7 |
| 2010/0232606 A1 * | 9/2010 | Lee et al. | 380/270 |
| 2011/0196977 A1 * | 8/2011 | Lynch et al. | 709/229 |
| 2011/0302643 A1 * | 12/2011 | Pichna et al. | 726/7 |
| 2012/0102559 A1 * | 4/2012 | Yoshida | 726/7 |
| 2012/0144461 A1 * | 6/2012 | Rathbun | 726/5 |
| 2012/0144471 A1 * | 6/2012 | Tsang et al. | 726/7 |
| 2012/0291106 A1 * | 11/2012 | Sasaki | 726/5 |
| 2014/0068707 A1 * | 3/2014 | Sakura et al. | 726/1 |

* cited by examiner

*Primary Examiner* — Abu Sholeman
(74) *Attorney, Agent, or Firm* — Kramer & Amado, P.C.

(57) ABSTRACT

A method for providing multiple authenticator support when responding to RADIUS Access Request messages is disclosed. The method for providing multiple authenticator support when responding to RADIUS Access Request messages includes receiving a RADIUS Access Request message, retrieving customer authentication information having a first and second authenticator value; attempting authentication against the first authenticator value, and in the event that a failure to authenticate occurs, then attempting authentication against the second authenticator value. In the event of a successful authentication against either the first or second authenticator value, a RADIUS Access Accept message is provided. Examples of first and second authenticator values include a UserName and a MAC address. The method for providing multiple authenticator support when responding to RADIUS Access Request messages provides advantages over single authenticator value systems known in the art.

10 Claims, 3 Drawing Sheets

RADIUS POLICY MULTIPLE AUTHENTICATOR SUPPORT

FIELD OF THE INVENTION

The invention relates to an Authentication, Authorization and Accounting (AAA) system, and more particularly to a Remote Authentication Dial-In User Service (RADIUS) protocol system.

BACKGROUND OF THE INVENTION

The RADIUS (Remote Authentication Dial-In User Service) protocol is widely used as a telecommunications standard protocol for the purposes of an AAA (Authentication, Authorization and Accounting) system. Among other uses, the protocol is used for performing mobile subscriber authentication for mobile Internet services, authorization verification and accounting information management. In operation, the RADIUS protocol uses a UDP (User Datagram Protocol) with a transport layer and conforms to a request/response scheme based on a client-server structure.

When employing the RADIUS protocol, some Internet Service Providers require end users to be authenticated by using the Media Access Control (MAC) address. Alternatively, Internet Service Providers may require end users to be authenticated by a UserName.

Using the standard RADIUS protocol as the primary authentication, end users can be authenticated only on MAC or alternatively on a UserName attribute, but cannot use both in the same authentication policy.

SUMMARY OF THE INVENTION

It is an object of the invention to provide a method of providing authentication based upon a joint MAC/UserName scheme wherein a failure to authenticate upon one parameter allows for a further authentication attempt based upon the alternative parameter.

According to another aspect of the invention there is provided a method performed by a RADIUS server for processing a RADIUS Access Request message, the method having the steps of: receiving the RADIUS Access Request message at the RADIUS server; retrieving customer authentication information comprising a first authenticator value and a second authenticator value from a Policy Manager Database to the RADIUS server; authenticating the Access Request against the first authenticator value, and in the event that a successful authentication occurs, respond with a RADIUS Access Accept message; and in the event that a successful authentication does not occur, then authenticating the Access Request against the second authenticator value, and in the event that a successful authentication occurs, respond with a RADIUS Access Accept; and in the event that a successful authentication does not occur, then respond with a RADIUS Access Reject message.

In some of these embodiments the first authenticator value is a UserName and the second authenticator value is a Media Access Control address.

In others of these embodiments the first authenticator value is a Media Access Control address and the second authenticator value is a UserName.

According to another aspect of the invention there is provided a non-transitory machine readable storage medium encoded with instructions for execution by a network processor within a RADIUS Server for processing a RADIUS Access Request message, the medium having: instructions for receiving a RADIUS Access Request message at the RADIUS server; instructions for retrieving customer authentication information comprising a first authenticator value and a second authenticator value from a Policy Manager Database to the RADIUS server; instructions for authenticating the Access Request against the first authenticator value, and in the event that a successful authentication occurs, respond with a RADIUS Access Accept message; and in the event that a successful authentication does not occur, then authenticating the Access Request against the second authenticator value, and in the event that a successful authentication occurs, respond with a RADIUS Access Accept; and in the event that a successful authentication does not occur, then respond with a RADIUS Access Reject message.

In some of these embodiments the instructions specify that the first authenticator value is a UserName and the second authenticator value is a Media Access Control address.

In others of these embodiments the instructions specify that the first authenticator value is a Media Access Control address and the second authenticator value is a UserName.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which like reference numbers are used to represent like elements, and.

DETAILED DESCRIPTION

Figure 1:
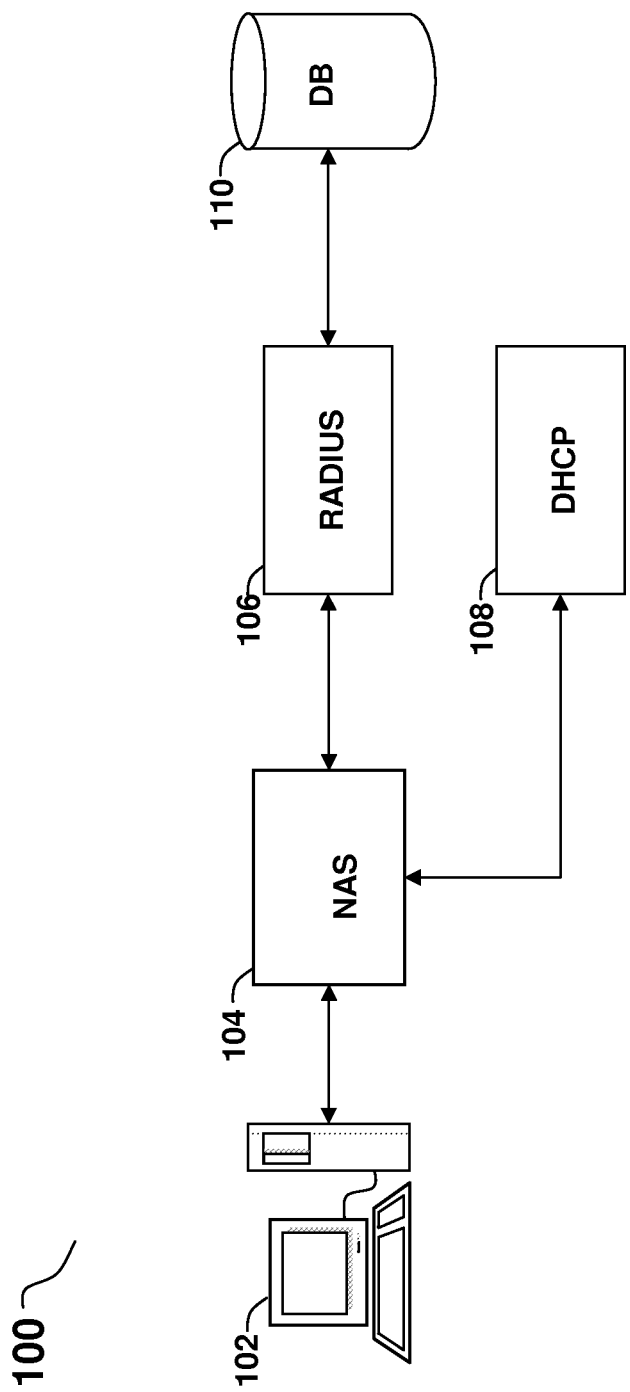
FIG. 1 illustrates a network having customer equipment connected to a network providing RADIUS protocol authentication thereto according to the prior art.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The techniques shown in the figures can be implemented using code and data stored and executed on one or more electronic devices (e.g., a network element). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Customer computer end stations (e.g., workstations, laptops, palm tops, mobile phones, etc.) access content/services provided over the Internet and/or content/services provided on associated networks such as the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, customer computing end stations are coupled (e.g., through customer premise equipment coupled to an access network, wirelessly to an access network) to edge network elements, which are coupled through core network elements of the Internet to the server computing end stations.

In the following figures, like reference numbers are used to represent like elements.

FIG. 1 illustrates an exemplary network environment 100. Exemplary network environment 100 may be a subscriber network for providing various services. In various embodiments, network 100 may be a public land mobile network (PLMN). Exemplary network 100 may be telecommunications network or other network for providing access to various services. Exemplary network 100 may include user equipment 102, Network Access Server (NAS) 104, Dynamic Host Configuration Protocol (DHCP) server 108, RADIUS Protocol server 106, and Policy Manager Database (DB) 110.

User equipment 102 may be a device that communicates with the network for providing the end-user with a data service. Such data service may include, for example, voice communication, text messaging, multimedia streaming, and Internet access. More specifically, in various exemplary embodiments, user equipment 102 is a personal or laptop computer, wireless email device, cell phone, tablet, television set-top box, or any other device capable of communicating with other devices.

Network Access Server 104 serves as a gate between user equipment 102 and the remainder of the network. As a threshold matter, the Network Access Server 104 has to authenticate the identity of a subscriber using user equipment 102 in order to ascertain the nature and scope of the services that may be provided. Authentication is the process of identifying an individual, usually based on either i) a username and password, or ii) a Medium Access Control (MAC) address assigned to a particular user's equipment. Authentication is based on the idea that each individual user will have unique information that distinguishes them from other users. Authorization is the process of granting or denying a user access to network resources once the user has been authenticated. The amount of information and the amount of services the user has access to depend on the user's authorization level.

The Dynamic Host Configuration Protocol (DHCP) server 108 communicates with the Network Access Server 104. Network Access Server 104 acting as a DHCP client uses the DHCP protocol to acquire configuration information, such as an IP address, a default route and one or more DNS server addresses from DHCP server 108.

The RADIUS Protocol server 106 communicates with the Network Access Server 104. RADIUS Protocol server 106 provides authentication in response to Access Request messages from the Network Access Server 104.

Policy Manager Database 110 may be a device that stores information related to subscribers to the network 100. Thus, Policy Manger Database 110 may include a machine-readable storage medium such as read-only memory (ROM), random-access memory (RAM), magnetic disk storage media, optical storage media, flash-memory devices, and/or similar storage media. Data stored by Policy Manager Database 110 may include subscription information such as identifiers for each subscriber, bandwidth limits, charging parameters, and subscriber priority.

Figure 2:
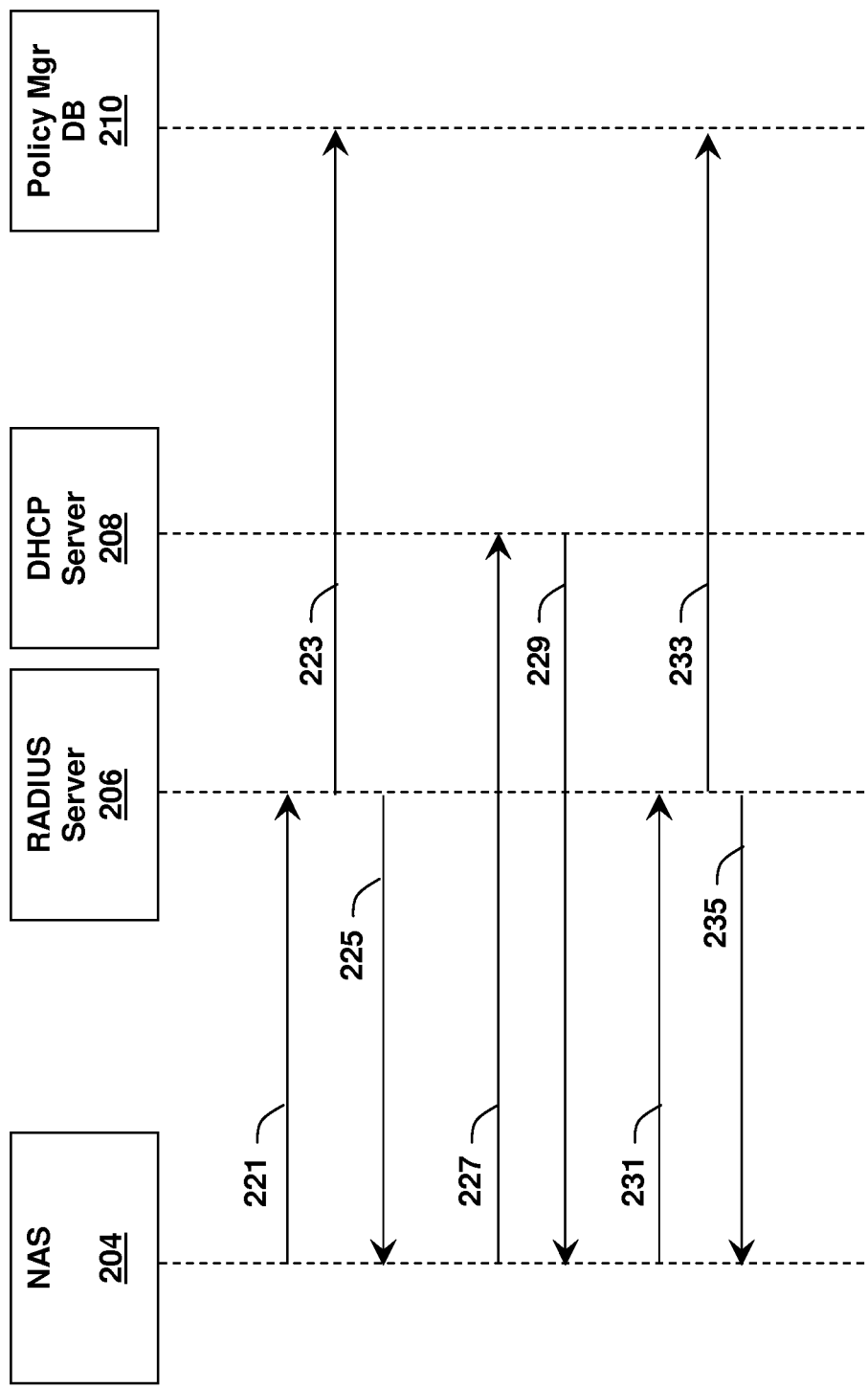
FIG. 2 illustrates a sequence flow diagram according to an embodiment of the invention.

Referring now to FIG. 2, there may be seen a sequence diagram of an overall flow of a communication process according to an embodiment of the invention. Network Access Server 204, using RADIUS based policy management, sends an Access Request 221 to the RADIUS server 206.

The Subscriber is modeled in the Policy Manager Database 210 to which RADIUS server 206 will have access for the authentication. At 223 the RADIUS server accesses the Policy Manager Database 210 to authenticate the user.

According to an embodiment of the invention, a new modifier called "authenticate-multiple" may be configured on the RADIUS Server with the value of "authenticate-multiple" to be any combination of authentication attribute "UserName" and "MAC". The possible values of "authenticate-multiple" are as follows:

{UserName, MAC}
{MAC, UserName}

In embodiments using the new modifier of form {UserName, MAC}, upon receiving Access Request 221 the RADIUS server 206 will first attempt to authenticate the user based on the UserName and if it fails then it will attempt to use the MAC for authentication.

Alternatively, in embodiments using the new modifier of form {MAC, UserName}, upon receiving Access Request 221 the RADIUS server 206 will first attempt to authenticate the user based on the MAC and if it fails then it will attempt to use the UserName for authentication In certain embodiments the configuration of the Network Access Server 204 will be such that the UserName attribute can be configured as a plain username with password for PAP/CHAP authentication. In other embodiments according to an alternate configuration of the Network Access Server 204 it may be configured as the Agent-Circuit-Id (according to DHCP Option 82:1).

Upon authentication, RADIUS server 206 provides a RADIUS Access Accept response message 225 indicating successful authentication. Upon receipt of RADIUS Access Accept response message 225, Network Access Server 204 sends a DHCP Request message 227 to DHCP server 108 to request configuration information. DHCP server 108 provides the configuration information via DHCP Offer 229.

Upon receipt of the configuration information Network Access Server 204 will configure user equipment 102 and send a RADIUS Accounting Request message 231 to RADIUS server 206. RADIUS server 206 then updates the Policy Manager Database 210 with appropriate accounting data into an accounting record via message 233. Subsequently, the RADIUS server 206 then sends a RADIUS Accounting Response message 235 to Network Access Server 204 to indicate database update has occurred.

According to some embodiments of the invention based upon the Network Access Server 204 provided by an Internet Service Provider, the Network Access Server 204 may be configured for the 82:1 authentication mode. In the event that the Subscriber relocates from one house to another house the Agent-Circuit-Id will change. Use of the "authenticate-multiple" modifier will mean that no effort is required from the Internet Service Provider to perform any configuration changes to ensure the services are provided to the relocated subscriber, because at the new location the Residential Gateway MAC will remain same as at the previous address.

Figure 3:
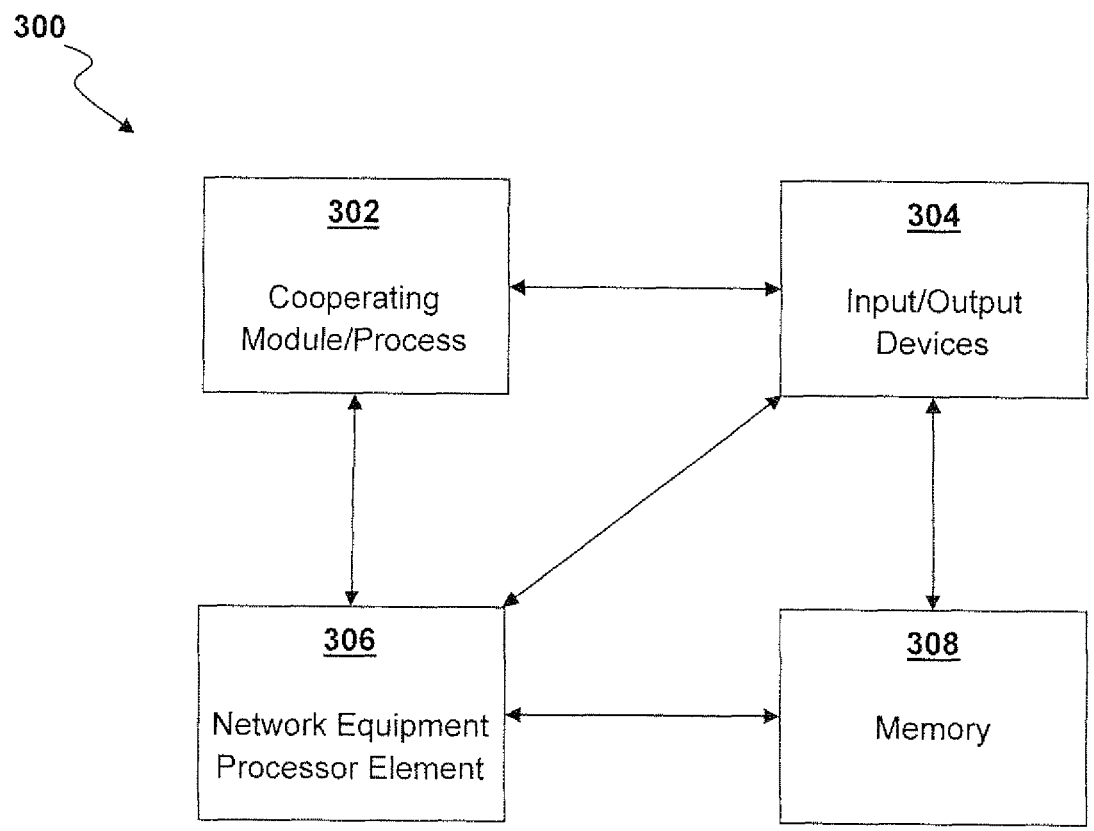
FIG. 3 illustrates a block diagram of a network equipment processor assembly according to an embodiment of the invention.

As depicted in FIG. 3, network equipment processor assembly 300 which in certain embodiments may be used in the RADIUS server, includes a network equipment processor element 306 (e.g., a central processing unit (CPU) and/or other suitable processor(s)), a memory 308 (e.g., random access memory (RAM), read only memory (ROM), and the like), a cooperating module/process 302, and various input/output devices 304 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 302 can be loaded into memory 308 and executed by network equipment processor 306 to implement the functions as discussed herein. As well, cooperating process 302 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

Therefore what has been disclosed is a method and associated system for providing dual authentication using RADIUS protocol upon which either a UserName authentication is attempted, and in the event of a failure a MAC authentication is attempted; or alternatively a MAC authentication is attempted and in the event of a failure a UserName authentication is attempted.

Note, in the preceding discussion a person of skill in the art would readily recognize that steps of various above-described methods can be performed by appropriately configured network processors. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices are all tangible and non-transitory storage media and may be, e.g., digital memories, magnetic storage media such as a magnetic disks and magnetic tapes, hard drives, or optically readable digital data storage media. The embodiments are also intended to cover network element processors programmed to perform said steps of the above-described methods.

Numerous modifications, variations and adaptations may be made to the embodiment of the invention described above without departing from the scope of the invention, which is defined in the claims.

What is claimed is:

1. A method performed by a RADIUS server for processing a RADIUS Access Request message, the method comprising:
   receiving said RADIUS Access Request message at the RADIUS server;
   retrieving a single-value customer authentication information comprising a first authenticator attribute and a second authenticator attribute from a Policy Manager Database to the RADIUS server;
   authenticating said Access Request against said first authenticator attribute, and
     when a successful authentication occurs, respond with a RADIUS Access Accept message; and
     when a successful authentication does not occur, then authenticating said Access Request against said second authenticator attribute, and when a successful authentication occurs, respond with a RADIUS Access Accept; and
when a successful authentication does not occur, then respond with a RADIUS Access Reject message.

2. The method as claimed in claim 1 wherein said first authenticator attribute is a UserName.

3. The method as claimed in claim 2 wherein said second authenticator attribute is a Media Access Control address.

4. The method as claimed in claim 1 wherein said first authenticator attribute is a Media Access Control address.

5. The method as claimed in claim 4 wherein said second authenticator attribute is a UserName.

6. A non-transitory machine readable storage medium encoded with instructions for execution by a network processor within a RADIUS Server for processing a RADIUS Access Request message, the medium comprising:
    instructions for receiving a RADIUS Access Request message at the RADIUS server;
    instructions for retrieving a single-value customer authentication information comprising a first authenticator attribute and a second authenticator attribute from a Policy Manager Database to the RADIUS server;
    instructions for authenticating said Access Request against said first authenticator attribute, and
        when a successful authentication occurs, respond with a RADIUS Access Accept message; and
    when a successful authentication does not occur, then authenticating said Access Request against said second authenticator attribute, and
        when a successful authentication occurs, respond with a RADIUS Access Accept; and
        when a successful authentication does not occur, then respond with a RADIUS Access Reject message.

7. The non-transitory machine readable storage medium as claimed in claim 6 wherein the instructions specify that said first authenticator attribute is a UserName.

8. The non-transitory machine readable storage medium as claimed in claim 7 wherein the instructions specify that said second authenticator attribute is Media Access Control address.

9. The non-transitory machine readable storage medium as claimed in claim 6 wherein the instructions specify that said first authenticator attribute is a Media Access Control address.

10. The non-transitory machine readable storage medium as claimed in claim 9 wherein the instructions specify that said second authenticator attribute is a UserName.

* * * * *